United States Patent Office 3,365,637
Patented Jan. 23, 1968

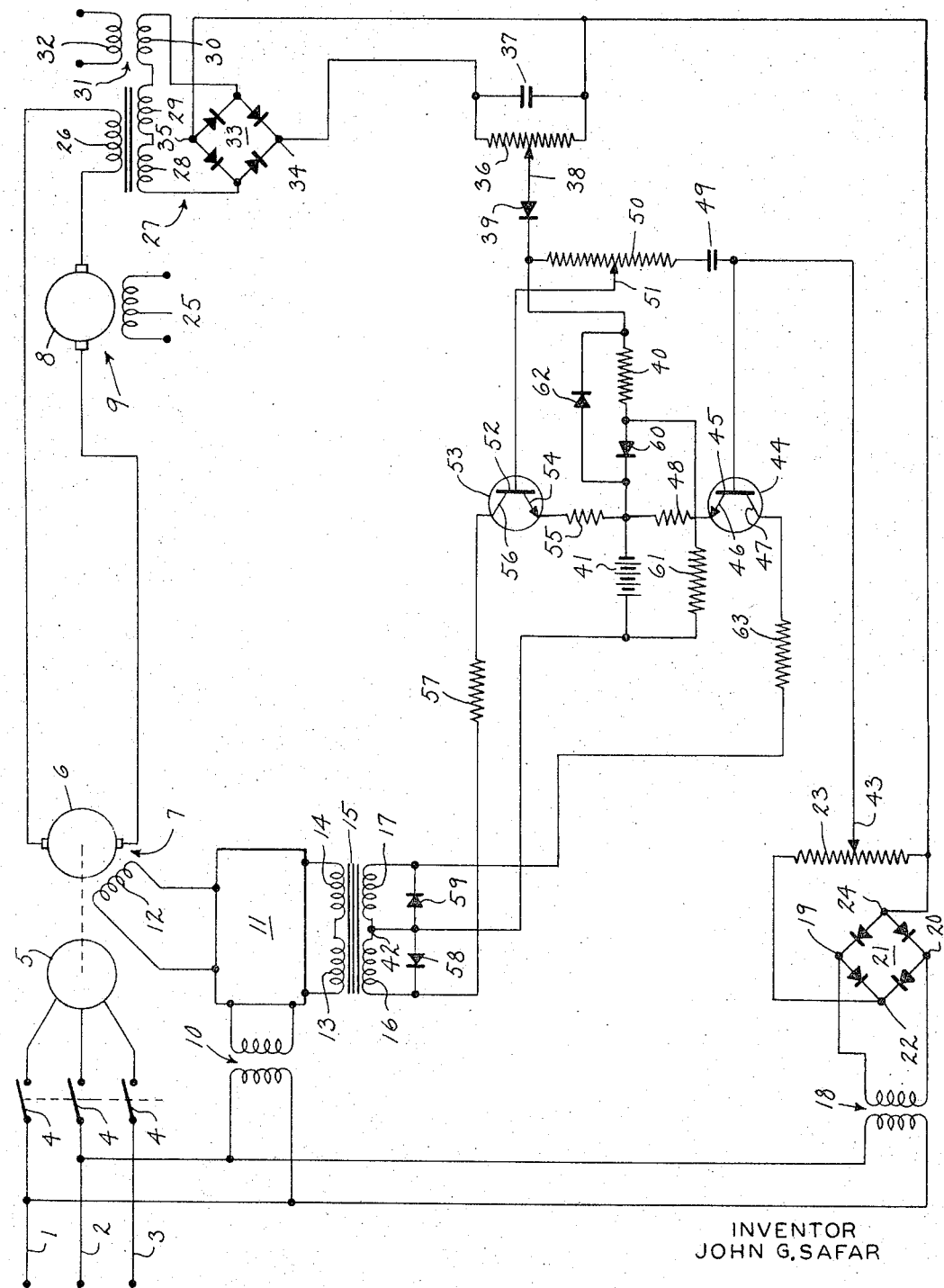

3,365,637
GENERATOR-FED MOTOR SPEED CONTROL
WITH BOTH REFERENCE AND FEEDBACK
DAMPING
John G. Safar, Milwaukee, Wis., assignor to Allen-Bradley Company, Milwaukee, Wis., a corporation of Wisconsin
Filed Mar. 2, 1964, Ser. No. 348,630
2 Claims. (Cl. 318—145)

The present invention relates to an error detector containing an oscillation damping means so as to provide a control system invulnerable to the effects of abrupt changes in the magnitude of an error signal; more specifically, the present invention resides in the combination of a comparison circuit connected between a feedback signal source and a reference signal source through an error signal output so as to provide an error control signal proportional to the error between the two sources; and a damping circuit containing a resistance-capacitance circuit connected across said feedback signal source and said reference signal source, having a tap on said resistance connected to said feedback signal source through a damping signal output means so as to provide a damping control signal proportional to an abrupt error signal change and in opposition to said error control signal.

Error detector circuits are devices for sensing the difference between a feedback signal and a reference signal and manifesting that difference in the form of a control signal for controlling a source of some sort. Error detectors have manifold applications and forms in various arts. The embodiment of the present invention to be described hereafter is an error detector for use in a direct current motor control. Error detectors for direct current motor control of the general type illustrated by the embodiment shown here compare a feedback voltage proportional to the armature current of the direct current motor with a reference voltage, which is usually obtained from a speed control, and an error or difference between the feedback voltage and the reference voltage is used to control the source of direct current to the armature of the motor. In such applications it is often possible for abrupt changes in the magnitude of the error signal to occur, and these may have various deleterious effects depending upon the characteristics of the system. For example, instantaneous changes in error signal magnitude may throw the entire control system into oscillation, so that control can be obtained over the motor once again only by shutting the entire system down. In other cases, for example when the motor is started with the speed control calling for full armature current, or where the operator abruptly manipulates the speed control resulting in an abrupt increase in the error signal calling for a drastic increase in armature current, the motor, unable to accelerate sufficiently rapidly under its load, may draw an excessive amount of current.

The present invention isolates the motor from abrupt variations in the error signal, regardless of the source or cause of those abrupt variations. This is accomplished by a circuit which provides the normal error control signal output and a damping control signal proportional to any abrupt signal changes in the error signal, the damping signal being connected to have the opposite effect on the source as the error control signal. By this means, voltage transients and other such short term signal variations may be cancelled entirely and have no effect upon the power source for the motor. However, where abrupt signal changes occur as a result of the operator's demand for acceleration, or a starting of the motor at full speed setting, these abrupt demands will produce a delayed, gradually increasing output from the power source to the armature of the motor.

Accordingly, it is an object of the present invention to provide an error detector capable of eliminating the effects of abrupt magnitude variations in the error control signal.

It is another object of the present invention to provide an error detector which will cancel the effect of short term, instantaneous signal changes in the error control signal to a power source.

It is another object of the present invention to provide an error detector which will dampen the effect of a demand for abrupt voltage change from a power source to result in only a gradual change in the output of said source.

The foregoing and other objects will appear in the description to follow. In the description, reference is made to the accompanying drawing which forms a part hereof and in which there is shown by way of illustration a specific embodiment in which this invention may be practiced. This embodiment will be described in sufficient detail to enable those skilled in the art to practice this invention, but it is to be understood that other embodiments of the invention may be used and that structural changes may be made in the embodiment described without departing from the scope of the invention. Consequently, the following detailed description is not to be taken in a limiting sense; instead, the scope of the present invention is best defined by the appended claims.

The drawing illustrates a single embodiment of the present invention as applied in an armature current feedback control system for a direct current motor powered by an M-G unit.

Referring now specifically to the drawing, power lines 1, 2 and 3 are connected through starter contacts 4 across a constant speed alternating current motor 5. The alternating current motor 5 is mechanically connected to drive an armature 6 of a direct current generator 7. The output of the direct current generator 7 is connected across an armature 8 of a direct current motor 9, which has its field winding 25 connected to a suitable excitation source not shown here.

The power lines 1 and 2 are also connected through a transformer 10 to a power supply 11 indicated by a box representing any of a number of different types of controls presently available on the market. The power supply 11 provides and controls the power to a field winding 12 for the direct current generator 7. The output of the power supply 11 is controlled by a saturable reactor represented here by gate windings 13 and 14, a core 15, and control windings 16 and 17. The control winding 16 on the left will be termed the damping signal control winding 16, and the control winding 17 on the right will be referred to as the error signal control winding 17.

The power lines 1 and 2 are also connected to the primary of a transformer 18 constituting the input for a reference voltage supply. A secondary of the transformer 18 is connected across the input terminals 19 and 20 of a conventional diode bridge type rectifier 21. The rectifier 21 has its positive output terminal 22 connected to the top end of a reference voltage potentiometer 23 and its negative output terminal 24 connected to the bottom end of the reference potentiometer 23. The reference potentiometer 23 is the machine operator's speed control in many embodiments.

In series with the motor armature 8 and the generator 7 is a control winding 26 of a conventional direct current transformer 27. The direct current transformer 27 has a pair of oppositely polarized gate windings 28 and 29 in series with a secondary winding 30 of an input transformer 31 which has its primary 32 connected across an appropriate source of alternating current not shown here. In series with the gate windings 28 and 29 and the secondary winding 30 of the input transformer 31 is a conventional diode bridge type rectifier 33. Output terminals 34 and 35 of the bridge rectifier 33 are connected across a feedback voltage potentiometer 36, and a filter capacitor 37 is connected across the feedback potentiometer 36.

The circuitry described in the preceding paragraphs is essentially environmental to the present invention, the description of which is now to follow. A slider 38 on the feedback potentiometer 36 may be considered a feedback signal source, and it is connected through a blocking diode 39, a current limiting resistor 40 and a unidirectional power source represented by a battery 41 to a junction 42 of the control coils 16 and 17 of the saturable reactor representing the control element of the power supply 11 to the generator field 12. A slider 43 on the reference output potentiometer 23 may be considered a reference signal source.

A comparison circuit to produce the error signal in this embodiment includes an amplifier transistor 44 which has its base 45 connected to the reference signal source, that is to say, connected to the slider 43 on the reference potentiometer. An emitter 46 of the comparison circuit transistor 45 is connected through a current limiting resistor 48 to the negative pole of the power source 41, and its collector 47 is connected to the control element of the power supply 11 through the error control winding 17 in the comparison circuit and a current limiting resistor 63.

A damping circuit to provide a damping control signal in this embodiment is energized from a series R-C network connected between the source of feedback voltage, i.e., the slider 38 on the feedback potentiometer 36, and the source of reference voltage, i.e., the slider 43 on the reference potentiometer 23. This R-C network consists of a damping capacitor 49 in series with a potentiometer 50. A slider 51 on the damping potentiometer 50 is connected to a base 52 of a damping signal amplifier transistor 53, which has its emitter 54 connected through a current limiting resistor 55 and the battery 41 to the junction 42 of the control elements 16 and 17, and its collector 56 connected through another current limiting resistor 57 to the opposite end of a damping control winding 16.

A pair of blocking diodes 58 and 59 are provided as overload shunt circuits joining the junction 41 of the error control coil 17 and the damping control coil 16 with the opposite ends of those coils 16 and 17 to avoid overloading the control coils 16 and 17. Also, a temperature stabilization circuit is provided as a physical part of a package containing the amplifier transistors 45 and 53, and it consists of a shunt circuit around the battery 41 containing a blocking diode 60 and a current limiting resistor 61, and a second shunt circuit containing a blocking diode 62 round the circuit limiting resistor 40. The blocking diode 60 and 62 have a negative temperature coefficient of resistance whether they are forward or reverse bias, and hence serve as temperature stabilizers.

In the operation of the present invention, when the constant speed alternating current motor 5 is energized from the power lines 1, 2 and 3, it will drive the armature 6 of the direct current generator 7. The output of the generator 7 will in turn provide the power to the armature 8 of the direct current motor 9. The amount of the power output of the generator 7 will depend upon the power supplied to its field winding 12, and this is ultimately controlled by the error detector embodying the present invention.

The machine operator will manipulate his speed control to the desired speed by setting the slider 43 on the speed calibrated reference potentiometer 23 at an appropiate position. The speed of the motor 9 is reflected in the back E.M.F. generated in the armature 8, which can be measured in terms of a voltage drop across the armature 8, assuming compensation for an IR drop in the armature 8 by means not shown in the drawing. Hence, the current through the armature 8 will vary with the speed of the motor 9 as the back E.M.F. varies. Therefore, a voltage proportional to the motor 9 speed may be imposed across the feedback potentiometer 36 by means of the direct current transformer 27 shown in the drawing.

By way of general description of the operation of the direct current transformer 27, let it suffice to note that the amount of armature current through its control winding 26 will determine the extent of saturation of the core shared with the gate windings 28 and 29. As the core saturation is greater or lesser, a greater or lesser impedance in the gate windings 28 and 29 is presented to the alternating current induced through the input transformer 31 and applied across the bridge rectifier 33. Hence, the voltage imposed on the feedback potentiometer 36 is proportional to the current in the armature 8 of the motor 9.

As the machine operator calls for greater speed, he makes the reference voltage on the slider 43 of the reference potentiometer 23 more positive with respect to the feedback potential at the slider 38 of the feedback potentiometer 36. Hence, current will tend to flow from the slider 43 on the reference potentiometer 23 to the base 44 of the amplifier transistor 45 in the error detecting comparison branch of the circuit. This base current will render the error signal amplifier transistor 45 conductive, permitting current from the unidirectional power source 41 to flow to the junction 42 between the damping control winding 16 and the error signal control winding 17, through the error signal control winding 17, the current limiting resistor 63, the collector 47 and emitter 46 of the transistor 45 and back to the source 42. The current thus passing through the error signal control winding 17 will be proportional to the error, or in other words, the potential difference between the slider 38 on feedbcak potentiometer 36 and the slider 43 on the reference potentiometer 23. The error signal, therefore, will continue to flow through the error control winding 17 until the reference source and feedback source are at the same potential. This signal through the error control winding 17 will permit greater current flow through the gate windings 13 and 14 and thus have the effect of producing greater energy in the field winding 12 of the generator 7. The increased energy to the generator field 12 will result in increased energy to the armature 8 of the direct current motor 9.

So long as a steady current flow is maintained through the comparison circuit, the damping capacitor 49 will not provide base current to the damping amplifier transistor 53 in the damping branch of the circuit. However, a sudden surge of power from the slider 43 on the slider 43 on the reference potentiometer 23 will place a large charge on the damping capacitor 49. If the surge of voltage is instantaneous, as for example if it were a transient, its effect will be counteracted by a surge of damping control signal in the damping control winding 16, simultaneous with the surge of error control signal in the error control winding 17 as the damping capacitor 49 discharge causes the damping amplifier 53 to conduct. However, if a surge of power results from a manipulation of the speed control, that is to say, the slider 43 on the reference potentiometer 23, and hence has a longer duration, the damping capacitor 49 discharging through the slider 51 of the damping potentiometer 50 to provide base current causing the amplifier 53 to conduct will have the effect of delaying the full output of the power supply 11 to gradually increase the energy in the field 12 as the damping capacitor 49 discharges.

The damping signal, whatever its cause, will flow from the power source 41 to the junction 42, and from there through the damping signal control winding 16 and back through the current limiting resistor 57, the collector 56, the emitter 54, and the resistor 55 to the source 42. Since this damping signal passes through the damping control winding 16 in an opposite direction from that of the error signal, it may be said to have an opposite polarity with respect to the control element, and hence will have the opposite effect of an error signal. For this reason, the initial effect of the very high current through the error signal control winding 17 will be for the most part cancelled by the effect of the initial damping signal through the damping signal control winding 16. If the error signal is of substantial duration, the output of the power supply 11 to the generator field winding 12 will gradually increase as the damping capacitor 49 discharges and the error between the slider 43 on the reference potentiometer 23 and the slider 38 on the feedback potentiometer 36 also becomes less. The result of these automatic adjustments is a delayed though continuous increase in power to the field winding 12, and hence in the power applied across the armature 8 of the direct current motor. 9.

From the foregoing discussion it is apparent how an error detector embodying the present invention will prevent oscillations in a control system due to instantaneous surges in the error signal, and by the same mechanism will also prevent sudden damaging power surges to the armature 8 of the direct current motor 9, but provide instead gradual power increases. In the embodiment of the present invention shown, amplifier transistors 45 and 53 are inserted respectively in the error detecting, comparison circuit and in the damping circuit. The purpose of these amplifiers 45 and 53 is to increase the sensitivity of the error detector. It will be apparent, however, to one skilled in the art that if sensitivity is not required the amplifiers may well be eliminated along with the power supply 41 so that the error current directly provides the error control and damping control signals for the damping control winding 16 and the error control winding 17. Also, other common forms of amplifiers will come to mind for application with the present invention. Equally obvious is the fact that in place of an armature current feedback in such a motor system, a tachometer output, or armature voltage feedback for example, could be supplied. Also, instead of an M-G unit providing the power to a direct current motor 8, the same error detector system could be utilized to control any other converter or voltage supply, such as an electronic converter using thyratron tubes or SCR's, and in such converters other types of control elements would be used instead of the saturable reactor with its gate windings 13 and 14 and its control windings 16 and 17 shown here. These and many other variations in the embodiment disclosed may be suggested by the mechanic of ordinary skill for application with the present invention without departing from the scope of that invention, which is set forth in the following claims.

I claim:
1. An error detector for a D-C motor control system wherein a D-C motor has an armature energized by a variable D-C power supply that is adapted to be controlled by an electrical error signal to vary its output to said armature, in combination therewith,
  a feedback signal source connected to sense the voltage drop across said armature and to emit a D-C feedback signal voltage of magnitude proportional to the speed of said D-C motor;
  a reference signal source including a variable D-C source adjustable to emit a D-C reference voltage at its output proportional to a desired speed for said D-C motor;
  a damping circuit including a resistor and a capacitor connected in series between the output of said feedback signal source and the output of said reference signal source;
  a first comparison circuit including an NPN transistor with a base-emitter circuit connected as said input across said output of said reference signal source and said output of said feedback signal source, and an emitter-collector circuit connected in series with a D-C source for error signal to control the flow of said error signal to said variable D-C power supply;
  a second comparison circuit including another NPN transistor having a base-emitter circuit connected from said resistor in said damping circiut to said emitter of said NPN transistor in said first comparison circuit and an emitter-collector circuit connected in series with said D-C source for error signal to control flow of said error signal to said variable D-C power supply, so as to emit a damping signal to said variable D-C power supply when an abrupt change occurs in said reference signal or said feedback signal.

2. An error detector for a D-C motor control system wherein the armature of the D-C motor is energized by a variable D-C power supply responsive to an electrical error signal to vary its output to said armature, the combination comprising
  a feedback signal source connected to sense the voltage drop across the armature of the motor and to emit a D-C feedback signal proportional to the speed of said motor;
  a reference signal source including a D-C source and being adjustable to emit a D-C reference signal proportional to a desired speed of said motor;
  a damping circuit including a resistor and a capacitor connected in series between said feedback signal source and said reference signal source;
  a first comparison circuit having a first transistor with a base circuit connected to said reference signal source and said feedback signal source, and with an emitter-collector circuit connected to a D-C error signal source to control the flow of error signal to said variable D-C power supply;
  a second comparison circuit including a second transistor having a base circuit connected to said resistor in said damping circuit and said emitter-collector circuit of said first transistor, having an emitter-collector circuit connected to said D-C error signal source to emit a damping signal to said variable D-C power supply when an abrupt change occurs in said reference signal or said feedback signal.

References Cited
UNITED STATES PATENTS

| | | | |
|---|---|---|---|
| 2,885,620 | 5/1959 | Haas | 318—286 X |
| 2,954,514 | 9/1960 | Hemstreet. | |
| 3,012,180 | 12/1961 | Finvold | 318—448 X |
| 3,187,243 | 6/1965 | Long | 318—6 |
| 3,293,522 | 12/1966 | Lewis | 318—257 |
| 2,439,198 | 4/1948 | Bedford. | |
| 2,496,391 | 2/1950 | Hall. | |
| 2,590,528 | 3/1952 | Gilbert. | |
| 2,600,308 | 6/1952 | Lund et al. | 318—158 |
| 2,629,847 | 2/1953 | Eames et al. | 318—158 X |
| 2,708,258 | 5/1955 | Westwood. | |
| 3,219,900 | 11/1965 | Wilkerson | 318—145 X |

ORIS L. RADER, *Primary Examiner.*

THOMAS LYNCH, *Assistant Examiner.*